(12) United States Patent
Han et al.

(10) Patent No.: US 9,190,004 B2
(45) Date of Patent: Nov. 17, 2015

(54) LIQUID CRYSTAL DISPLAY DEVICE

(71) Applicant: LG DISPLAY CO., LTD., Seoul (KR)

(72) Inventors: Jae Jung Han, Seoul (KR); Se Min Lee, Gyeonggi-do (KR); Joo Young Yeon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 250 days.

(21) Appl. No.: 13/727,754

(22) Filed: Dec. 27, 2012

(65) Prior Publication Data

US 2014/0022156 A1    Jan. 23, 2014

(30) Foreign Application Priority Data

Jul. 23, 2012    (KR) .................. 10-2012-0080134

(51) Int. Cl.
  *G09G 3/36*    (2006.01)
  *H05B 35/00*    (2006.01)
  *G09G 3/34*    (2006.01)

(52) U.S. Cl.
  CPC ............ *G09G 3/3648* (2013.01); *G09G 3/3406* (2013.01); *G09G 2360/144* (2013.01)

(58) Field of Classification Search
  CPC .............. G09G 2320/0626; G09G 2360/144; G09G 3/3406
  USPC .................... 345/87–104, 173–174
  See application file for complete search history.

(56) References Cited

U.S. PATENT DOCUMENTS

| | | | |
|---|---|---|---|
| 7,924,371 B1 * | 4/2011 | Davis | ............................... 349/68 |
| 8,350,827 B2 | 1/2013 | Chung et al. | |
| 2005/0179850 A1 * | 8/2005 | Du | .................. G02F 1/133615 349/150 |
| 2006/0007107 A1 * | 1/2006 | Ferguson | ...................... 345/102 |
| 2008/0001910 A1 | 1/2008 | Lim | |
| 2008/0136336 A1 * | 6/2008 | Kalnitsky et al. | ............. 315/158 |
| 2008/0266273 A1 * | 10/2008 | Slobodin et al. | ............... 345/174 |
| 2009/0167656 A1 * | 7/2009 | Ahn et al. | ........................ 345/87 |

(Continued)

FOREIGN PATENT DOCUMENTS

| | | |
|---|---|---|
| CN | 101097309 A | 1/2008 |
| CN | 101153972 A | 4/2008 |

(Continued)

OTHER PUBLICATIONS

Taiwan Office Action issued in Taiwanese Patent Application No. 101149569 on Jan. 16, 2015.

(Continued)

*Primary Examiner* — Temesgh Ghebretinsae
*Assistant Examiner* — Kwin Xie
(74) *Attorney, Agent, or Firm* — Morgan, Lewis & Bockius LLP

(57) ABSTRACT

An LCD device is disclosed which includes: at least one sensor module configured to sense an amount of external light; a liquid crystal display panel configured to display images; at least one light source module disposed under the liquid crystal display panel and configured to emit light; and at least one light guide plate configured to convert light from the at least one light source module into two-dimensional light and apply two-dimensional light to the liquid crystal display panel. The at least one light source module includes infrared LEDs and visible LEDs which are selectively driven according to a sensed light quantity sensed by the at least one sensor module and allow infrared light and visible light to be selectively emitted.

19 Claims, 9 Drawing Sheets

(56) References Cited

U.S. PATENT DOCUMENTS

| | | |
|---|---|---|
| 2011/0102392 A1 | 5/2011 | Fujioka et al. |
| 2011/0134369 A1* | 6/2011 | Song .................... G02B 6/0021 349/65 |
| 2011/0149204 A1 | 6/2011 | Son |
| 2012/0081412 A1 | 4/2012 | Kim et al. |
| 2012/0249438 A1* | 10/2012 | Kim et al. .................... 345/173 |
| 2013/0229357 A1* | 9/2013 | Powell .................. G06F 3/0412 345/173 |
| 2014/0036533 A1* | 2/2014 | Smith-Gillespie G02F 1/133615 362/609 |

FOREIGN PATENT DOCUMENTS

| | | |
|---|---|---|
| CN | 102102855 A | 6/2011 |
| CN | 102446495 A | 5/2012 |
| JP | 2012-094486 A | 5/2012 |

OTHER PUBLICATIONS

Chinese Office Action issued in Chinese Patent Application No. 201210599189.1 on Aug. 4, 2015.

Chinese Search Report issued in Chinese Patent Application No. 201210599189.1 on Aug. 4, 2015.

* cited by examiner

LIQUID CRYSTAL DISPLAY DEVICE

The present application claims priority under 35 U.S.C. §119(a) of Korean Patent Application No. 10-2012-0080134 filed on Jul. 23, 2012, which is hereby incorporated by reference in its entirety.

BACKGROUND

1. Field of the Disclosure

The present application relates to a liquid crystal display device.

2. Description of the Related Art

With the development of an information society, the requirements for display devices used to display images have been increased in a variety of manners. As such, flat display devices being thinner and lighter weight compared to cathode ray tubes (CRTs) of the related art are being actively researched and manufactured. The flat display devices include liquid crystal display (LCD) devices, plasma display devices (PDPs), organic light emitting display (OLED) devices and so on. Among the flat display devices, the LCD devices are now widely being used because of features such as small size, light weight, slimness and low power drive.

FIG. 1 is a disassembled perspective view showing an LCD device according to the related art.

Referring to FIG. 1, the related art LCD device includes a LCD panel 10 configured to display images, and a backlight unit 20 disposed under the LCD panel 10 and configured to apply light to the LCD panel 10. Also, the LCD device further includes a top cover 1 configured to encompass edges of the upper surface of the LCD panel 10 and combined with the backlight unit 20, and a support main 18 configured to support edges of the lower surface of the LCD panel 10 and combined with the backlight unit 20.

A gate printed-circuit-board (PCB) 13 is disposed beside an edge of the LCD panel 10 and configured to apply gate signals to gate lines of the LCD panel 10. A data PCB 15 is disposed beside another edge of the LCD panel 10 and configured to apply data voltages to data lines of the LCD panel 10. A plurality of flexible printed-circuit substrates 17 are arranged between the gate and data PCBs 13 and 15 and the LCD panel 10. As such, the gate PCB 13 can be connected to the gate lines of the LCD panel 10 through the flexible printed-circuit substrates 17. Similarly, the data PCB 15 can be connected to the data lines of the LCD panel 10 through the flexible printed-circuit substrates 17.

The backlight unit 20 includes a box-shaped bottom cover 70 with an opened upper surface, light source 50 disposed in an inner side surface of the bottom cover 70, a light guide plate 40 disposed parallel to the light source 50, optical sheets 30 disposed on the light guide plate 40, and a reflection sheet 60 disposed under the light guide plate 40. The light guide plate 40 is configured to convert incident light from the light source 50 into a two-dimensional light. The optical sheets 30 are configured to diffuse and converge the two-dimensional light entered from the light guide plate 40. The reflection sheet 60 reflects light progressing downward from the light guide plate 40 toward the LCD panel 10, in order to reduce light leakage.

The backlight unit 20 further includes a housing 51 configured to encompass a side of the light source 50. The housing 51 guides light emitted from the light source 50 to enter an incident surface of the light guide plate 40.

In general, light emitting diode (LED) can be used as a light source for the LCD device. In detail, an LED configured to emit visible light is used as a light source for the LCD device. Such an LCD device can be used for a special purpose. In other words, the LCD device can be used when concealment is required in nighttime under a special circumstance such as a military operation and so. However, it is difficult to use the LCD device under the circumstance in which concealment is required because a user using the LCD device is exposed to everyone. This results from the fact that a visible LED is employed as a light source of the LCD device. Meanwhile, night vision goggles using infrared light instead of visible light are being mainly employed, in order to secure the view in the nighttime.

In view of this point, it is necessary to develop an LCD device for special purposes which uses both visible light and infrared light.

BRIEF SUMMARY

Accordingly, embodiments of the present application are directed to an LCD device that substantially obviates one or more of problems due to the limitations and disadvantages of the related art.

The embodiments are to provide an LCD device that is adapted to selectively display an infrared image and a visible light image on the basis of external light.

Also, the embodiments are to provide an LCD device that is adapted to be thinner and selectively display an infrared image and a visible light image.

Moreover, the embodiments are to provide an LCD device that is adapted to enhance uniformity of images and selectively display an infrared image and a visible light image.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to a first general aspect of the present embodiment, an LCD device includes: at least one sensor module configured to sense an amount of external light; a liquid crystal display panel configured to display images; at least one light source module disposed under the liquid crystal display panel and configured to emit light; and at least one light guide plate configured to convert light from the at least one light source module into two-dimensional light and apply two-dimensional light to the liquid crystal display panel, wherein the at least one light source module includes infrared LEDs and visible LEDs which are selectively driven according to a sensed light quantity sensed by the at least one sensor module and allow infrared light and visible light to be selectively emitted.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
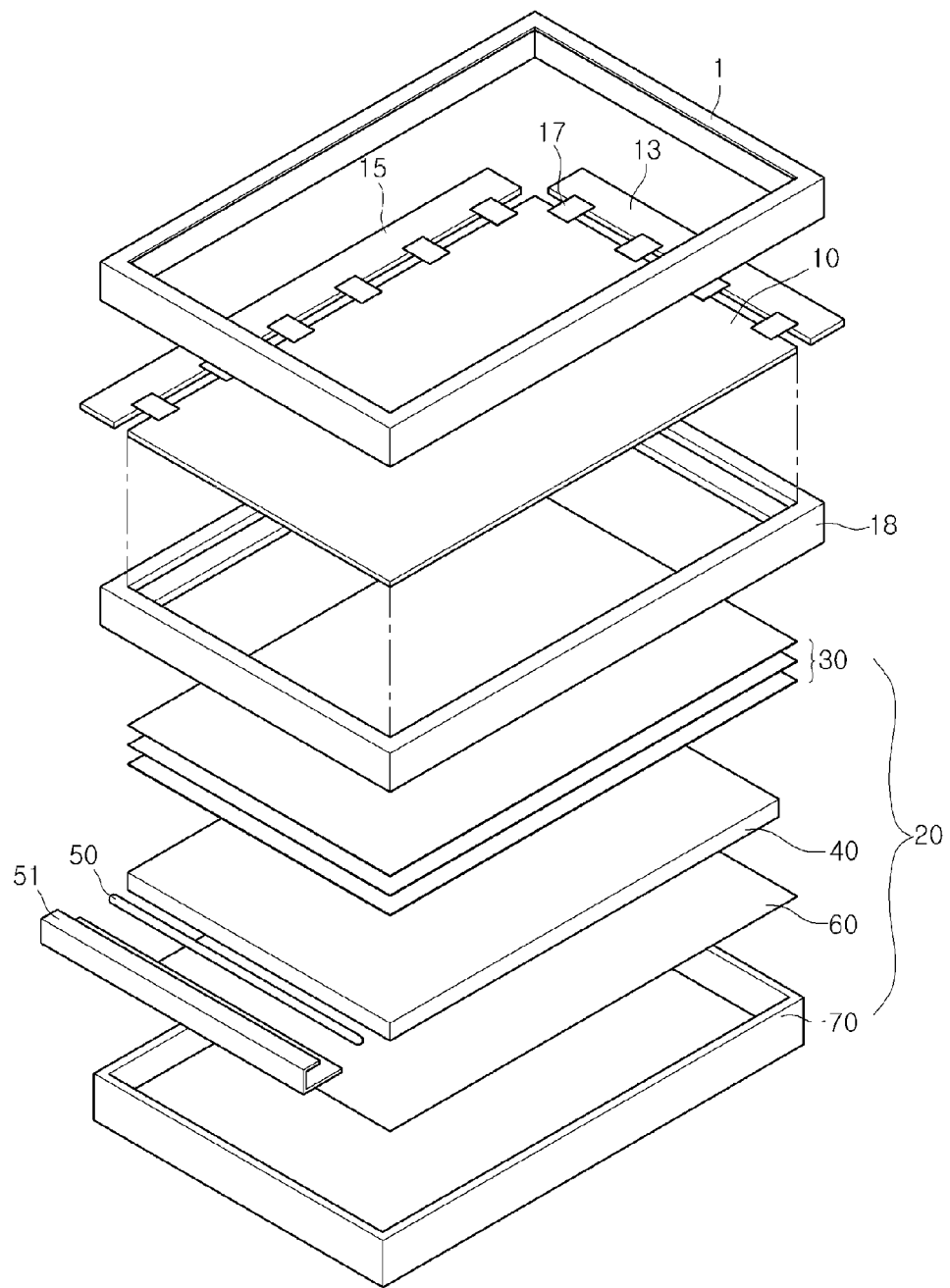
FIG. 1 is a disassembled perspective view showing an LCD device according to the related art.

In the present disclosure, it will be understood that when an element, such as a substrate, a layer, a region, a film, or an electrode, is referred to as being formed "on" or "under" another element in the embodiments, it may be directly on or under the other element, or intervening elements (indirectly) may be present. The term "on" or "under" of an element will be determined based on the drawings.

Reference will now be made in detail to the present embodiments, examples of which are illustrated in the accompanying drawings. In the drawings, the sizes and thicknesses of elements can be exaggerated, omitted or simplified for clarity and convenience of explanation, but they do not mean the practical sizes of elements.

An LCD device according to an embodiment of the disclosure includes: at least one sensor module configured to sense an amount of external light; a liquid crystal display panel configured to display images; at least one light source module disposed under the liquid crystal display panel and configured to emit light; and at least one light guide plate configured to convert light from the at least one light source module into two-dimensional light and apply two-dimensional light to the liquid crystal display panel. The at least one light source module includes infrared LEDs and visible LEDs which are selectively driven according to a sensed light quantity sensed by the at least one sensor module and allow infrared light and visible light to be selectively emitted.

The infrared LEDs and the visible LEDs can be arranged alternately with each other on a PCB (printed circuit board).

The LCD device can further include a backlight driver configured to drive the light source module based on a sensing voltage which varies along the sensed light quantity and is applied from the at least one sensor module.

The backlight driver includes an infrared light driver configured to drive the infrared LEDs and a visible light driver configured to drive the visible LEDs. Also, the backlight driver can selectively drive the infrared light driver and the visible light driver according to the level of the sensing voltage.

The backlight driver can further include a comparator the sensing voltage with a reference voltage, and enable the infrared light driver and the visible light driver to be selectively driven according to a resultant compared by the comparator.

The backlight driver can further include a first transistor connected to the infrared light driver and a second transistor connected to the visible light driver. Also, the backlight driver can control the first and second transistors to be turned-on/off according to the resultant compared by the comparator.

The backlight driver can further include a voltage input portion configured to apply a drive voltage to the infrared light driver and the visible light driver regardless of the sensing voltage.

The at least one sensor module can include a photo diode.

The LCD device can further includes a top cover configured to cover edges of the liquid crystal display panel, and a bottom cover configured to receive the at least one light guide plate and the at least one light source module. The at least one sensor module can be disposed on a front surface of the top cover, the backlight driver can be disposed on a rear surface of the bottom cover, and the at least one sensor module and the backlight driver can be electrically connected to each other by means of a flexible printed-circuit board.

The at least one sensor module can include a plurality of sensor modules disposed on at least one of the top cover and the bottom cover.

The backlight driver can obtain an average value from a plurality of light quantities from the plurality of sensor modules and selectively drive the visible light driver and the infrared light driver based on the average value.

The at least one light source module can include light source modules disposed near both side surfaces of the light guide plate.

The infrared LEDs can be arranged near a side surface of the light guide plate, and the visible LEDs can be arranged near the other side surface of the light guide plate.

The at least one light source module can include a first PCB (printed circuit board) loaded with the visible LEDs, and a second PCB configured to include a plurality of protrusive regions each loaded with the infrared LEDs.

The second PCB can be attached to the first PCB, and the protrusive regions can be each disposed between the visible LEDs.

The sum of thicknesses of the infrared LED and the second PCB is the same as the thickness of the visible LED.

The at least one light guide plate can include a first light guide plate and a second light guide plate disposed under the first light guide plate. The visible LEDs can be arranged near a side surface of the first light guide plate, and the infrared LEDs can be arranged near a side surface of the second light guide plate.

The LCD device can further include different patterns formed on surfaces of the first and second light guide plates and configured to enhance light uniformity.

The LCD device can further include polarizer sheets attached to both surfaces of the liquid crystal display panel. The polarizer sheets can become one of a wire grid polarizer sheet, a birefringent polarizer sheet and a cholesteric liquid crystal polarizer sheet.

The backlight driver can include: an infrared light driver configured to drive the infrared LEDs; a visible light driver configured to drive the visible LEDs; and an MCU (micro control unit) configured to selectively drive the infrared light driver and the visible light driver according to the level of the sensing voltage.

Figure 2:
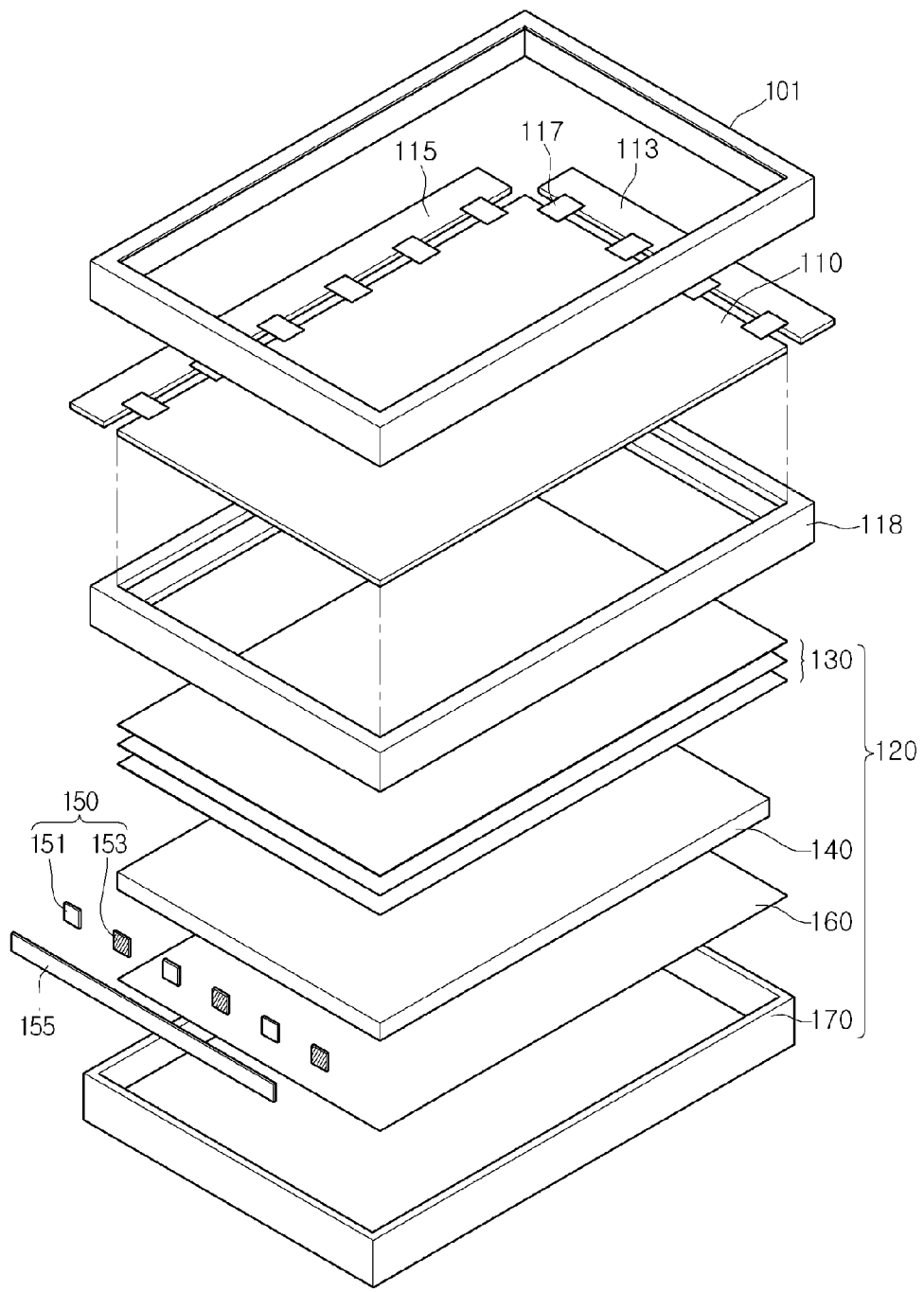
FIG. 2 is a disassembled perspective view showing an LCD device according to a first embodiment of the present disclosure.

FIG. 2 is a disassembled perspective view showing an LCD device according to a first embodiment of the present disclosure.

Referring to FIG. 2, the LCD device according to a first embodiment of the present disclosure includes a LCD panel 110 configured to display images, and a backlight unit 120 disposed under the LCD panel 110 and configured to apply light to the LCD panel 110. The LCD device further includes a top cover 101 configured to encompass edges of the upper surface of the LCD panel 110 and combined with the backlight unit 120, a support main 118 configured to support edges of the lower surface of the LCD panel 110 and combined with the backlight unit 120, and a bottom cover 170 configured to receive the backlight unit 120.

The top cover 101 can be formed along edge areas of the LCD panel 110 in such a manner as to have an open central area. Such a top cover 101 is used to support the LCD panel 110 and protect the LCD panel 110 from external impacts.

The support main 118 can be formed to have an open central area. Such a support main 118 with the open central area can guide light to be transferred from the backlight unit 120 to the LCD panel.

Also, the LCD device includes a gate PCB 113 and a data PCB 115. The gate printed-circuit-board (PCB) 113 can be disposed beside an edge of the LCD panel 110 and configured to apply gate signals to gate lines of the LCD panel 110. The data PCB 115 can be disposed beside another edge of the LCD panel 110 and configured to apply data voltages to data lines of the LCD panel 110. Although it is not shown in the drawing, the gate and data PCBs 113 and 115 can be formed in a single body united with each other. A plurality of flexible printed circuit (FPC) substrates 117 are arranged between the gate and data PCBs 113 and 115 and the LCD panel 110. As such, the gate PCB 113 can be connected to the gate lines of the LCD panel 110 through the FPC substrates 117. Similarly, the data PCB 115 can be connected to the data lines of the LCD panel 110 through the FPC substrates 117. A driver integrated-circuit (IC) chip is mounted on each FPC substrate 117. The driver IC chip can be one of a gate driver IC chip and a data IC chip.

The backlight unit 120 can include optical sheets, a light guide plate 140, a light source 150, a PCB 155 and a reflection sheet 160.

The optical sheets 130 are disposed between the LCD panel 110 and the light guide plate 140. The optical sheets 130 are used to scatter and diffuse light from the light guide plate 140. The scattered and diffused light is transferred from the optical sheets 130 to the LCD panel 110. Such optical sheets 130 can include a prism sheet, a diffusion sheet and so on.

The light source 150 can be mounted on the PCB 155. Also, the light source can include visible LEDs 151 and infrared LEDs 153. The visible LEDs 151 and the infrared LEDs 153 can be arranged alternately with each other on the PCB 155. The infrared LED 153 can emit infrared light corresponding to a wavelength range of 780 nm~2000 nm. The light source 150 and the PCB 155 can configure a light source module.

The light guide plate 140 converts light emitted from the light source 150 into a two-dimensional light. The light guide plate 140 can be formed from poly methyl methacrylate (PMMA). PMMA can enables light corresponding to a wavelength range of 500 nm~1000 nm to penetrate through it. As such, the light guide plate 140 formed from PMMA can convert not only visible light from the visible LED 151 but also infrared light from the infrared LED 153 into two-dimensional light.

Drive lines used to transfer drive voltages to the light source are formed on the PCB 155. The visible LED 151 and the infrared LED 153 are driven by different drive voltages from each other. As such, the visible LEDs 151 and the infrared LEDs 153 receive the respective drive voltages to through the drive lines different from each other.

The LCD panel 110 can include a color filter substrate, a thin film transistor substrate, and a liquid crystal layer interposed between the color filter substrate and the thin film transistor substrate. Also, the LCD panel 110 can include polarizer sheets attached to the color filter substrate and the thin film transistor substrate.

As an example of the polarizer sheet, one of a wire-grid polarizer sheet, a birefringent polarizer sheet and a cholesteric liquid crystal polarizer sheet which are suitable for both visible light and infrared light can be used. The polarizer sheet can enable incident light parallel to a polarization direction to penetrate through. However, the polarizer sheet can reflect incident light being not parallel to the polarization direction.

The liquid crystal layer can become one of twisted nematic (TN), vertical alignment (VA) and in-plane switching (IPS) modes.

Figure 3:
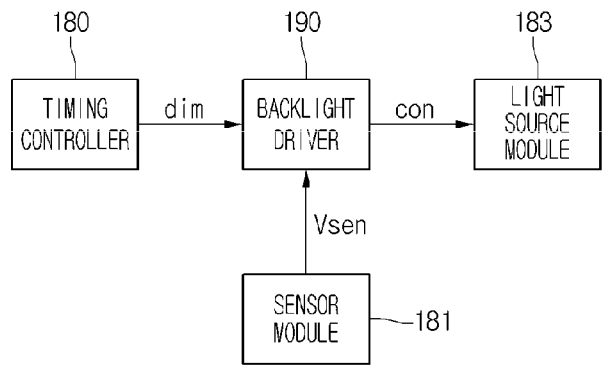
FIG. 3 is a block diagram showing a backlight drive circuit of the LCD device according to a first embodiment of the present disclosure.

FIG. 3 is a block diagram showing a backlight drive circuit, which is used to drive the backlight unit of the LCD device, according to a first embodiment of the present disclosure.

Referring to FIG. 3, the backlight drive circuit according to a first embodiment of the present disclosure can include a timing controller 180, a sensor module 181, a light source module 183 and a backlight driver 190.

The timing controller 180 applies a dimming signal dim to the backlight driver 190.

The sensor module 181 can sense external light. Also, the sensor module 181 can apply a sensing voltage Vsen in accordance with sensed light to the backlight driver 190.

The backlight driver 190 can be driven by the dimming signal dim applied from the timing controller 180 and derive a control signal con from the sensing signal Vsen. The control signal Vsen is applied from the backlight driver 190 to the light source module 183. In other words, the backlight driver 190 can generate the control signal, which is used to selectively drive visible LEDs and infrared LEDs, based on the sensing voltage Vsen and apply the control signal con to the light source module 183. For example, when external light is brightly sensed by the sensor module 181, the backlight driver 190 generates the control signal con for driving the visible LEDs and the control signal con to the light source module 183. On the contrary, if external light is feebly sensed by the sensor module 181, the backlight driver 190 generates a control signal for driving the infrared LEDs and applies the control signal con to the light source module 183. The control signal can be a constant current signal.

In this manner, the sensor module 183 senses external light and the backlight driver 190 selectively drives the visible LEDs and the infrared LEDs according to the sensed resultant. As such, the LCD device of the present embodiment can be used for a special purpose. The LCD device for the special purpose can sense day and night and switch a drive mode based on the sensed resultant. Therefore, the LCD device can prevent mishandling of a user.

The light source module 183 can receive the control signal con from the backlight driver 190 and emit one of visible light and infrared light. To this end, the light source module 183 can include visible LEDs and infrared LEDs.

Figure 4:
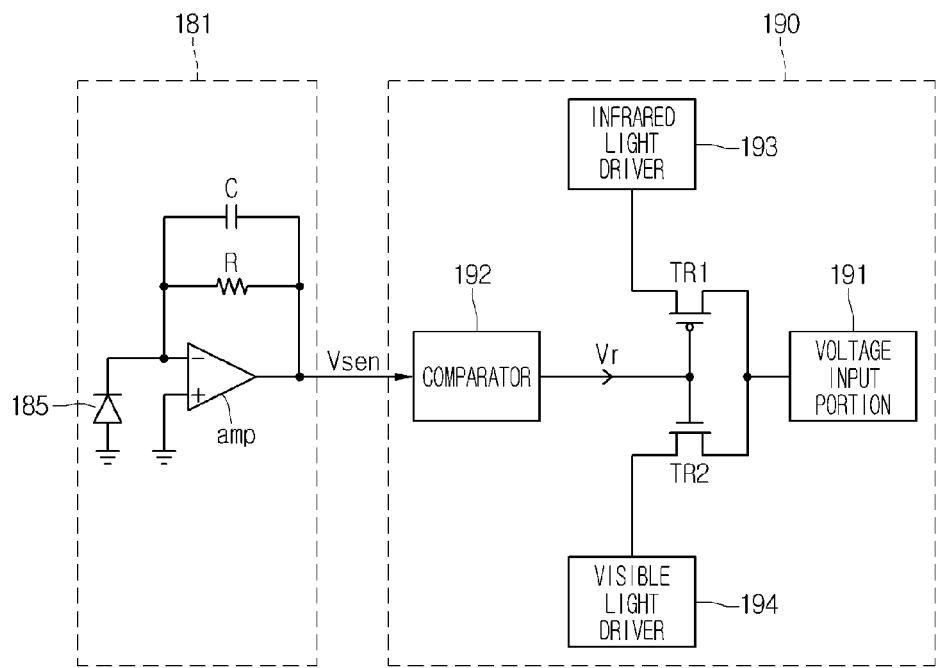
FIG. 4 is a circuit diagram showing a sensor portion and a backlight driver of the LCD device according to a first embodiment of the present disclosure.

FIG. 4 is a circuit diagram showing a sensor module and a backlight driver of the LCD device according to a first embodiment of the present disclosure;

Referring to FIG. 4, the backlight driver 190 of the LCD device according to a first embodiment of the present disclosure can include a voltage input portion 191, a comparator 192, an infrared light driver 193 and a visible light driver 194.

The sensor module 181 can include an operational amplifier amp, a photo diode 185, a resistor R and a capacitor C. The photo diode 185 is connected to an inverted terminal of the operational amplifier amp. Also, the photo diode 185 generates a voltage of which the level is varied along the intensity of light applied from the exterior. The resistor R and the capacitor C can be connected parallel to each other between an output terminal and the inverted terminal of the operational amplifier amp. A voltage, that is, the sensing voltage Vsen generated at the output terminal of the operational amplifier amp can be determined according to the output voltage of the photo diode 185.

The sensing voltage Vsen can be applied to the comparator 192 of the backlight driver 190. The comparator 192 can compare the sensing voltage Vsen with a reference voltage, which is previously set, in order to generate a control voltage Vr. The control voltage Vr can enable the infrared light driver 193 and the visible light driver 194 to be selectively controlled.

In the daytime, the sensing voltage Vsen with a relatively high level is derived from a large amount of light which is applied to the photo diode 185 of the sensor module 181. Then, the comparator 192 comparing the sensing voltage Vsen with the reference voltage outputs the control voltage Vr higher than the threshold voltage of a second transistor TR2. The high control voltage Vr turns-on the second transistor TR2 and enables a visible light drive voltage to be transferred from the voltage input portion 191 to the visible light driver 194. As such, the visible light driver 194 drives the visible LEDs within the light source module 183 of FIG. 3 to emit visible light. In accordance therewith, the LCD device displays images which are visible to human eyes without any special equipment. Meanwhile, an infrared light drive voltage is not applied to the infrared light driver 193 because the first transistor TR1 is turned-off.

On the contrary, in the nighttime, the sensing voltage Vsen with a relatively low level is derived from a small amount of light which is applied to the photo diode 185 of the sensor module 181. Then, the comparator 192 comparing the sensing voltage Vsen with the reference voltage outputs the control voltage Vr capable of turning-on the first transistor TR1. The first transistor TR1 being turned-on by the control voltage Vr transfers the infrared light drive voltage from the voltage input portion 191 to the infrared light driver 193. As such, the infrared light driver 193 drives the infrared LEDs within the light source module 183 of FIG. 3 to emit infrared light. Therefore, the LCD device displays images which are visible to human eyes only through special equipment such as night vision goggles. Meanwhile, the visible light drive voltage is not applied to the visible light driver 194 because the second transistor TR2 is turned-off.

For example, it is assumed that the reference voltage is set to be 1V. In this case, the infrared light driver 193 can be driven when the sensing voltage Vsen no more than 1V is output from the sensor module 181. On the other hand, the visible light driver 194 can be driven when the sensing voltage Vsen of 1V~5V is output from the sensor module 181.

The first and second transistors TR1 and TR2 can be the different types of transistors. For example, the first transistor TR1 can be a p-type transistor and the second transistor TR2 can be an n-type transistor.

In FIG. 4, it is shown that the voltage input portion 191 within the backlight driver 190 applies the same drive voltage to both the first and second transistors TR1 and TR2 using the same line, that is, a single line. However, the voltage input portion 191 can apply drive voltages, which have different levels from each other, to the first and second transistors TR1 and TR2.

The sensing voltage Vsen can be directly applied from the sensor module 181 to the first and second transistors TR1 and TR2 without passing through the comparator 192. In this case, threshold voltages of the first and second transistors TR1 and TR2 may be adjusted by a designer so that the visible light driver 194 is driven when the sensing voltage Vsen is the reference voltage or more but the infrared light driver 193 is driven when the sensing voltage Vsen is lower than the reference voltage.

Figure 5:
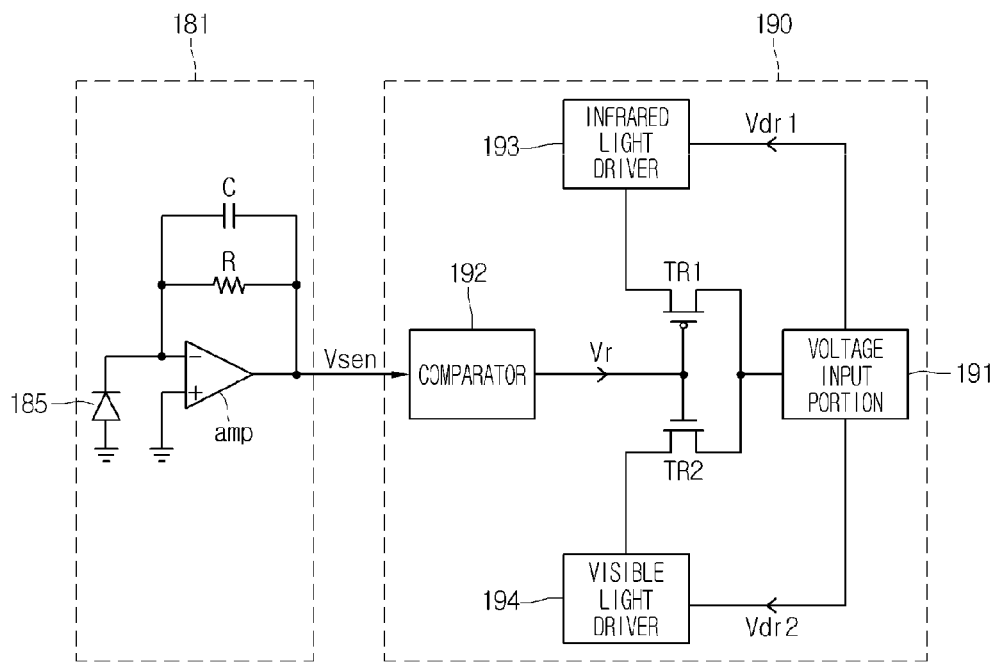
FIG. 5 is a circuit diagram showing sensor portion and light source driver of the LCD device according to a second embodiment of the present disclosure.

FIG. 5 is a circuit diagram showing a sensor module and a backlight driver of the LCD device according to a second embodiment of the present disclosure.

The second embodiment has the same configuration as the first embodiment except that two lines used to directly transfer different drive voltages from the voltage input portion 191 to the infrared light driver 193 and the visible light driver 194 are added into the backlight driver 190. As such, the components of the second embodiment being the same as those of the first embodiment will be referred to with the same numbers as those of the first embodiment. Moreover, the description of the first embodiment to be repeated in the second embodiment of the present disclosure will be omitted.

In the LCD device according to a second embodiment of the present disclosure, a first drive voltage Vdr1 can be applied from the voltage input portion 191 to the infrared light driver 193. Also, a second drive voltage Vdr2 can be applied from the voltage input portion 191 to the visible light driver 194.

More specifically, the voltage input portion 191 can enable one of the first and second drive voltages Vdr1 and Vdr2 to be applied to one the infrared light driver 193 and the visible light driver 194 according to the selection of a user. If the user wants to drive the LCD device in a visible light mode, the second drive voltage Vdr2 can be applied from the voltage input portion 191 to the visible light driver 194. On the other hand, when the user wants to drive the LCD device in an infrared mode, the first drive voltage Vdr1 can be applied from the voltage input portion 191 to the infrared light driver 193. Moreover, the first and second drive voltages Vdr1 and Vdr2 can be output from the voltage input portion 191, in order to drive both the infrared light driver 193 and the visible light driver 194. The selective output of the first and second drive voltages Vdr1 and Vdr2 can be controlled by means of a switch element which can be manipulated by a user. The switch element can be included into the voltage input portion 191.

The first embodiment only controls the infrared mode and the visible light mode to be automatically selected according to the sensed light quantity. However, the second embodiment can provide a passive selection, which allows the infrared mode and the visible light mode to be passively selected by the manipulation of a user, as well as the above-mentioned active selection.

Figure 6:
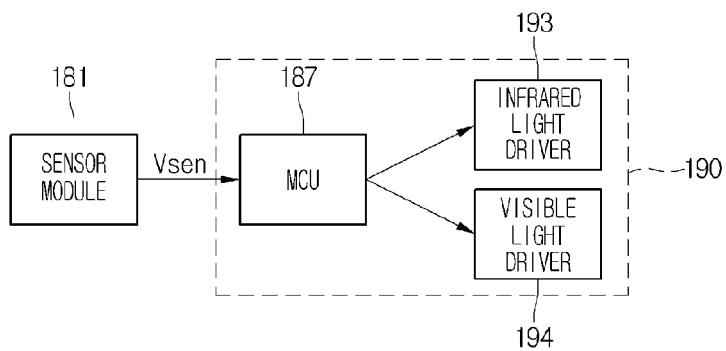
FIG. 6 is a block diagram showing a sensor portion and a backlight driver of the LCD device according to a third embodiment of the present disclosure.

FIG. 6 is a block diagram showing a backlight driver of the LCD device according to a third embodiment of the present disclosure.

Referring to FIG. 6, the backlight driver 190 of the LCD device according to a third embodiment of the disclosure can include an infrared light driver 193, a visible light driver 194 and a micro control unit (MCU) 187 connected to the sensor module 181.

The sensor module 181 can sense an amount of external light and can apply a sensing voltage Vsen in correspondence with the sensed light quantity to the MCU 187.

The MCU 187 receiving the sensing voltage Vsen can selectively drive the infrared light driver 193 and the visible light driver 194 according to the sensing voltage Vsen using a previously set algorism. The algorism previously set into the MCU 187 can be programmed by a user. In other words, the MCU 187 using the previously set algorism can selectively drive the infrared light driver 193 and the visible light driver 194 based on the level of the sensing voltage Vsen.

The infrared light driver 193 and the visible light driver 194 can be selectively driven by signals applied from the MCU 187.

Figure 7A:
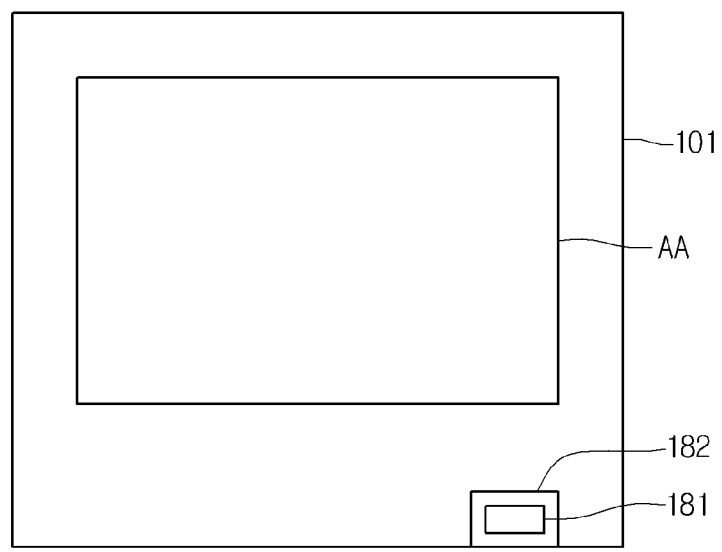
FIGS. 7A and 7B are planar views showing the front and rear surfaces of an LCD device according to a first embodiment of the disclosure.
Figure 7B:
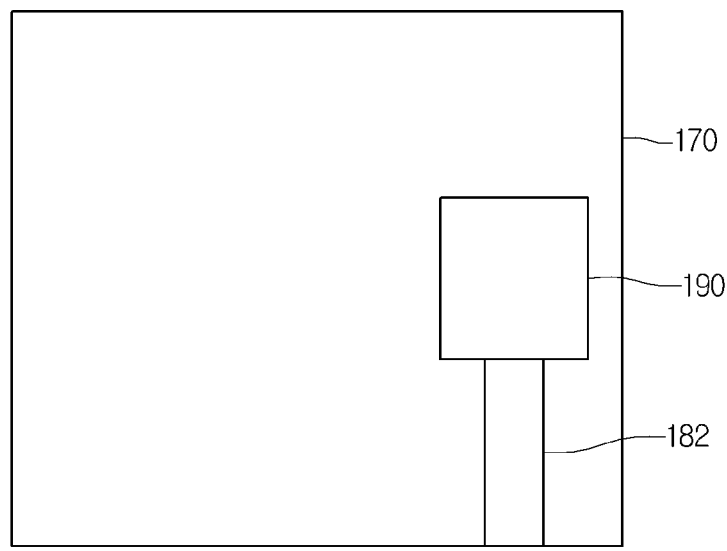

FIGS. 7A and 7B are planar views showing the front and rear surfaces of an LCD device according to a first embodiment of the disclosure.

FIG. 7A is a planar view showing the front surface of an LCD device according to a first embodiment of the disclosure. As shown in FIG. 7A, the front surface of the LCD device according to a first embodiment of the disclosure can include a display area AA. The display area AA can be defined by the top cover 101 of a quadrilateral frame shape with an opening. The display area AA corresponds to a central portion of the LCD panel exposed by the top cover 101.

A connection substrate 182 is disposed on an edge of the top cover 101. The connection substrate 182 can be a FPC board.

The connection substrate 182 can be loaded with the sensor module 181. The sensor module 181 can be mounted on the connection substrate 182 through a SMT (surface mount technology) process. The sensor module 181 can sense an external light quantity and generate the sensing voltage in correspondence with the sensed light quantity. The sensing voltage can be applied from the sensor module 181 to the backlight driver 190.

FIG. 7B is a planar view showing the rear surface of an LCD device according to a first embodiment of the disclosure. As shown in FIG. 7B, the backlight driver 190 is disposed on the bottom cover 170 which corresponds to the rear surface of the LCD device according to a first embodiment of the present disclosure. The backlight driver 190 can drive the backlight unit, that is, the light source module 183.

The backlight driver 190 can be connected to the connection substrate 182. As such, the backlight driver 190 can be electrically connected to the sensor module 181 through the connection substrate 182. Also, the sensing voltage can be transferred from the sensor module 181 to the backlight driver 190 through the connection substrate 182. The connection substrate 182 being a FPC board can be bent from an edge of the rear surface of the LCD device to an edge of the front surface in such a manner as to pass over one side surface.

Although it is explained that the sensor module is disposed on an edge of the front surface of the LCD device, the first embodiment is not limited to this. Alternatively, the sensor module 181 can be disposed one of the rear surface and the side surfaces of the LCD device.

Also, the LCD device can include a plurality of sensor modules 181. The LCD device with the plurality of sensor modules 181 can more accurately detect the daytime and the night time based on the sensed light quantities. More specifically, a plurality of sensing voltages is generated by means of the plurality of sensor modules 181 within the LCD device. The backlight driver 190 can derive an average value from the plurality of sensing voltage and detect the daytime and the nighttime on the basis of the calculated average value.

Figure 8:
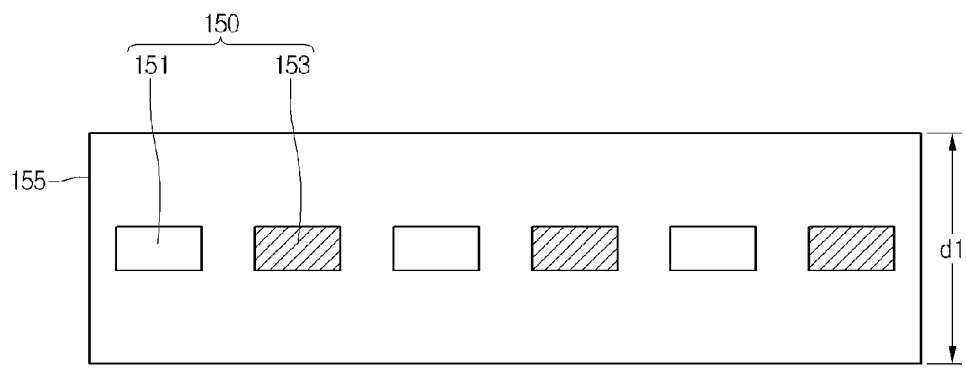
FIG. 8 is a planar view showing a light source module of the LCD device according to a first embodiment of the present disclosure.

FIG. 8 is a planar view showing a light source module of the LCD device according to a first embodiment of the present disclosure.

Referring to FIG. 8, the light source module of the LCD device according to a first embodiment of the present disclosure includes a PCB 155 and a plurality of light sources 150 mounted on the PCB 155. The light sources 150 include visible LEDs 151 and infrared LEDs 153. The visible LEDs 151 and the infrared LEDs can be arranged alternately with each other on the PCB 155. The visible LEDs 151 and the infrared LEDs 153 are driven by different drive voltages from each other. As such, a plurality of drive voltage lines, which are used to transfer the drive voltages from the backlight driver 190 to the light sources 150, must be formed on the PCB 155. Also, the PCB 155 can be formed to have a first width d1, in order to secure a process margin of the drive voltage lines and stability of the drive voltage lines against a short circuit.

Figure 9A:
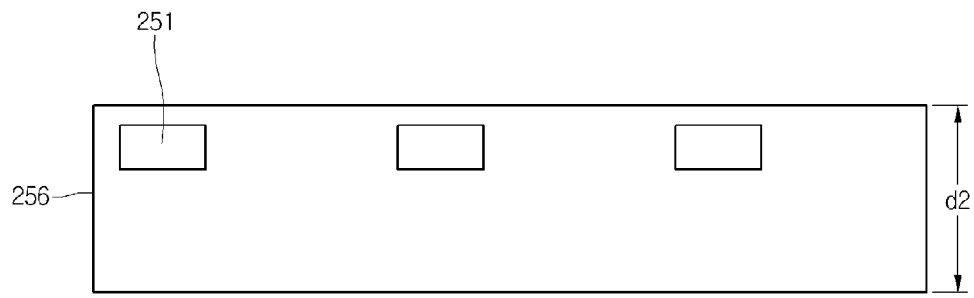
FIGS. 9A through 9C are planar views illustrating the manufacturing method of a light source module of the LCD device according to a second embodiment of the present disclosure.
Figure 9B:
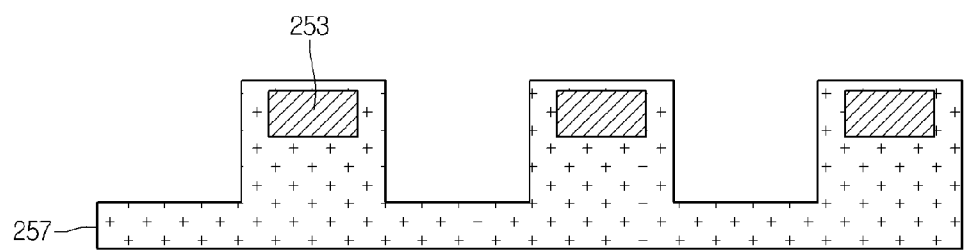
Figure 9C:
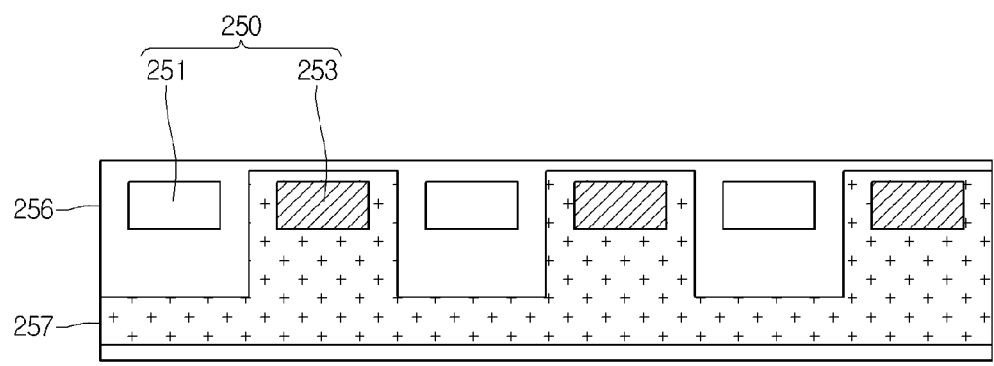

FIGS. 9A through 9C are planar views illustrating the method of manufacturing a light source module of the LCD device according to a second embodiment of the present disclosure.

As shown in FIG. 9A, a first PCB 256 loaded with a plurality of visible LEDs 251 is prepared. The plurality of visible LEDs 251 can be arranged at a fixed interval. The visible LEDs 251 can be arranged on regions of the first PCB 256 opposite to the visible LEDs of FIG. 8. The plurality of visible LEDs 251 can be driven by the same drive voltage. As such, the number of drive voltage lines used to connect the visible LEDs 251 to the backlight driver can be reduced. The reduction of the drive voltage lines can allow the first PCB 256 to be reduced by the width of an upper area which is positioned above the top edge line of the visible LEDs 251. In accordance therewith, the first PCB 256 can be formed to have a second width d2. The second width d2 can become smaller than the first width d1 of FIG. 8.

Referring to FIG. 9B, a second PCB 257 loaded with a plurality of infrared LEDs 253 is prepared. The second PCB 257 can have a plurality of protrusive regions such as rectangular-shaped tooth. Such a second PCB 257 can expose the visible LEDs 251 of FIG. 9A between the protrusive regions. The infrared LEDs 253 are disposed on the protrusive regions of the second PCB 257, respectively. In other words, the infrared LEDs 253 can be disposed on the regions of the second PCB 257 opposite to the infrared LEDs of FIG. 8. The plurality of infrared LEDs 253 can be driven by the same drive voltage. As such, the number of drive voltage lines used to connect the infrared LEDs 253 to the backlight driver can be reduced. In accordance therewith, the second PCB 257 can be formed to have a narrower width compared to the PCB of FIG. 8.

As shown in FIG. 9C, the second PCB 257 can be attached to the first PCB 256. The first and second PCB combined with each other can enable the visible LEDs 251 and the infrared LEDs 253 to be arranged alternately with each other. Since the light sources 150 including the visible LEDs 251 and the infrared LEDs 253 are distributed to the first and second PCBs 256 and 257, the entire width of the combined PCBs (i.e., a PCB of the light source module) can be reduced. In other words, because the first PCB 256 is formed to have a second width d2 narrower than the first width d1 of the PCB of FIG. 8, the width (i.e., the height) of the combined PCBs can be reduced. In general, the width (i.e., the height) of the PCB of the light source module affects thicknesses of the backlight unit and the LCD device. Therefore, the combined PCBs 256 and 257 with the reduced width (i.e., the reduced height) can allow both the backlight unit and the LCD device makes to become thinner.

Figure 10A:
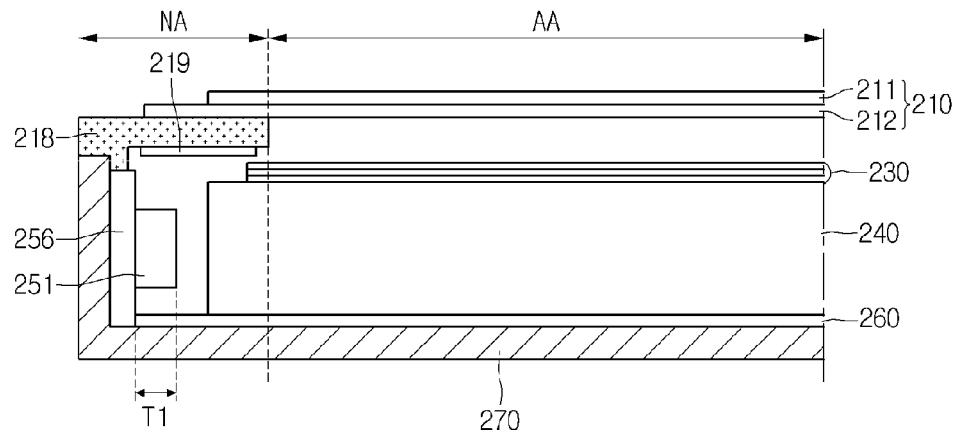
FIGS. 10A and 10B are cross-sectional views illustrating a method of manufacturing an LCD device according to a second embodiment of the present disclosure.
Figure 10B:
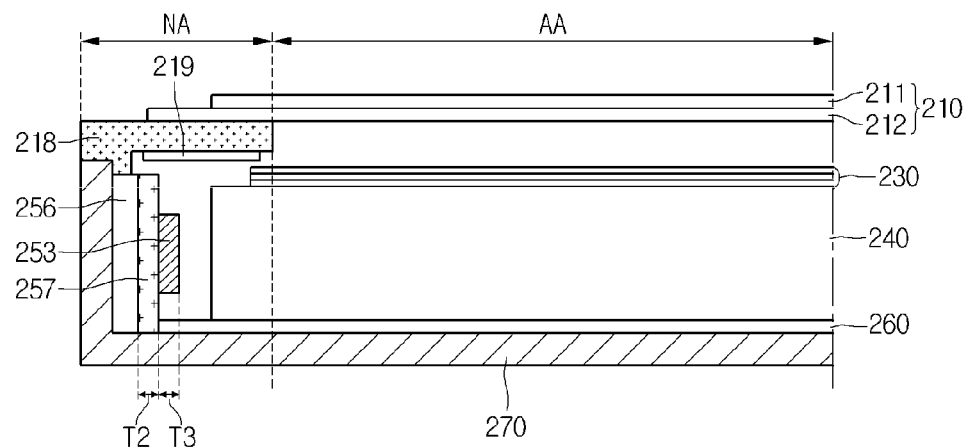

FIGS. 10A and 10B are cross-sectional views illustrating the manufacturing method of an LCD device according to a second embodiment of the present disclosure;

In the manufacturing method of an LCD device according to a second embodiment of the present disclosure, a rectangular-box-shaped bottom cover 270 and a support main 218 combined with the bottom cover 270 are prepared as shown in FIG. 10A. A first PCB 256 can be disposed on an inner side surface of the bottom cover 270. A plurality of visible LEDs 251 can be mounted on the first PCB 256. The visible LEDs 251 can be formed to have a first thickness T2.

A reflection sheet 260 can be disposed on the bottom surface of the bottom cover 270. A light guide plate 240 can be disposed on the reflection sheet 260. Optical sheets 230 can be disposed on the light guide plate 240. The reflection sheet 260 is used to reflect light from a light guide plate 240. The light guide plate 240 converts incident light from a light source into two-dimensional light. The optical sheets 230 diffuses and converges the two-dimensional light entered from the light guide plate 240. Also, the optical sheets 230 apply the diffused and converged light to an LCD panel 210.

The LCD panel 210 is disposed on the support main 218. The LCD panel 210 can include a color filter substrate 211 and a thin film transistor substrate 212. An upper reflection sheet 210 is attached to the lower surface of the support main 218. The upper reflection sheet 219 reflects light from the light source toward the bottom surface of the bottom cover 270 and makes it possible to reuse light, in order to enhance light efficiency.

A display area AA used to display images and a non-display area NA in which any image is not displayed can be defined by the support main 218. The non-display area NA may correspond to edge areas in which two-dimensional light progressing from the light guide plate 240 to the LCD panel 210 is shielded by the support main 218.

Referring to FIG. 10B, the manufacturing method of an LCD device according to a second embodiment of the present disclosure attaches a second PCB 257 to the first PCB 256. A plurality of infrared LEDs 253 can be arranged on the second PCB 257. The second PCB 257 can be formed in a second thickness T2. The infrared LEDs 253 can be formed to have a third thickness T3. The sum of the second and third thicknesses T2 and T3 can be set to be the same as the first thickness T1. The front surfaces of the visible LEDs 251 and the infrared LEDs 253, which face an incident surface of the light guide plate 240, can form the same flat because the sum of the second and third thicknesses T2 and T3 is the same as the first thickness T1. As such, the distances from the visible LED 251 and the infrared LED 253 to the incident surface of the light guide plate 240 are the same as each other. In accordance therewith, the uniformity of light being entered the light guide plate 240 can be enhanced.

In this way, the visible LEDs 251 are mounted on the first PCB 256 and the infrared LEDs 253 are mounted on the second PCB 257. However, the LCD device of the second embodiment is not limited to this. In other words, the positions of the visible and infrared LEDs 251 and 253 can be exchanged for each other. Also, the infrared LEDs 253 can be replaced with a different kind of LEDs.

Figure 11:
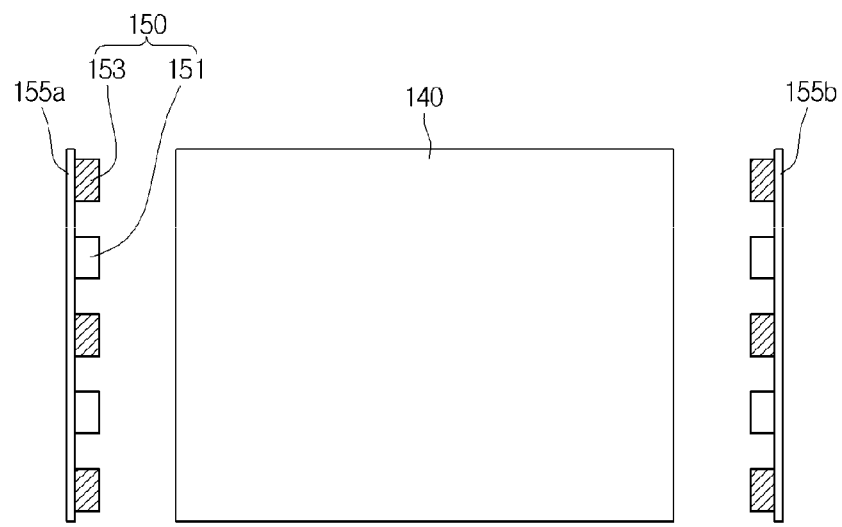
FIG. 11 is a planar view showing a light guide plate and light source modules according to a third embodiment of the present disclosure.

FIG. 11 is a planar view showing the light guide plate and the light source modules of an LCD device according to a third embodiment of the present disclosure.

Referring to FIG. 11, the LCD device according to a third embodiment of the present disclosure forces first and second PCBs 155a and 155b are disposed near both side surfaces of a light guide plate 140. Light sources 150 can be arranged on each of the first and second PCBs 155a and 155b. The light sources can include visible LEDs 151 and infrared LEDs 153. The visible LEDs 151 and the infrared LEDs 153 can be arranged alternately with each other on each of the first and second PCBs 155a and 155b. Since the first and second PCBs 155a and 155b are disposed near both side surfaces of the light guide plate 140, the brightness of a large-sized LCD device can be enhanced and the uniformity of an image can be secured. Moreover, picture quality can be enhanced.

The first and second PCBs 155a and 155b disposed near both side surface of the light guide plate 140 can be formed to have a single substrate, like that of the light source module according the first embodiment. In a different manner, the first and second PCBs 155a and 155b can be formed to have at least two substrates overlapped with each other, like those of the light source module according to the second embodiment.

The first PCB 155a and the visible and infrared LEDs 151 and 153 loaded thereon can form a first light source module. Also, the second PCB 155b and the visible and infrared LEDs 151 and 153 loaded thereon can form a second light source module.

Figure 12:
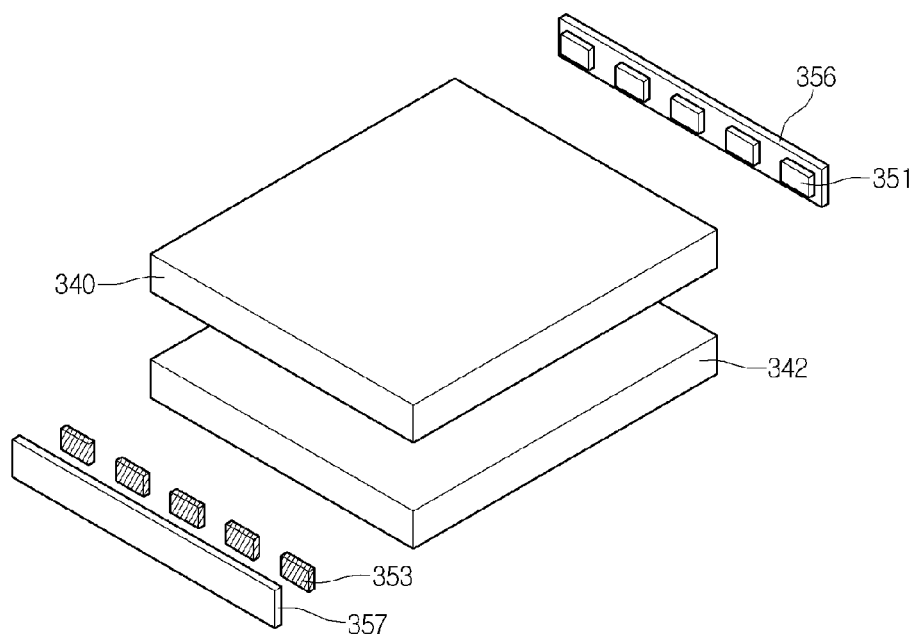
FIG. 12 is a planar view showing a light guide plate and light source modules according to a fourth embodiment of the present disclosure.

FIG. 12 is a planar view showing the light guide plate and the light source modules of an LCD device according to a fourth embodiment of the present disclosure.

Referring to FIG. 12, the LCD device according to a fourth embodiment of the present disclosure forces first and second PCBs 356 and 357 are disposed near both side surfaces of a light guide plate 340. A plurality of visible LEDs 351 can be mounted on the first PCB 356. A plurality of infrared LEDs 353 can be mounted on the second PCB 357.

The visible LEDs 351 on the first PCB 356 can be driven in such a manner as to be separated from the infrared LEDs on the second PCB 357. As such, the LCD device can be selectively driven in a visible mode for displaying visible light images and an infrared image mode for displaying infrared images.

The visible LED 351 and the infrared LED 353 are driven by different drive voltages from each other. As such, the visible LEDs 351 and the infrared LEDs 353 are mounted on different PCBs 356 and 357 which are disposed near both side surface of the light guide plate 340. In accordance therewith, the widths of the first and second PCBs 356 and 357 can be reduced. The first and second PCBs 356 and 357 with the narrow widths can reduce the thicknesses of the backlight unit and the LCD device.

The first PCB 356 and the visible LEDs 351 loaded thereon can form a first light source module. Similarly, the second PCB 357 and the infrared LEDs 353 loaded thereon can form a second light source module.

Figure 13:
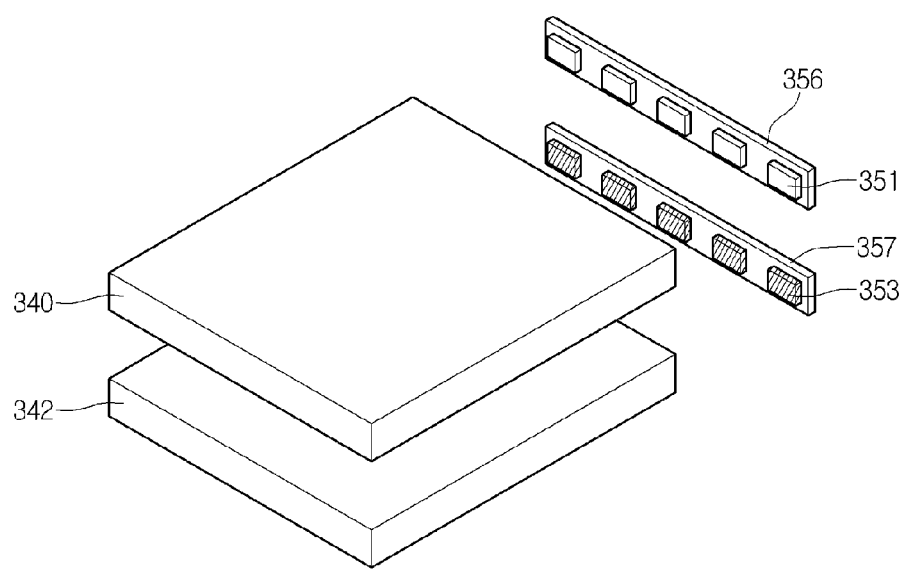
FIG. 13 is a planar view showing light guide plates and light source modules according to a fifth embodiment of the present disclosure.

FIG. 13 is a disassembled perspective view showing the light guide plates and the light source modules of an LCD device according to a fifth embodiment of the present disclosure.

Referring to FIG. 13, the LCD device according to a fifth embodiment of the present disclosure can include a first light guide plate 341 and a second light guide plate 342.

A first PCB 356 can be disposed to face a side surface of the first light guide plate 341. The first PCB 356 can be loaded with visible LEDs 351.

The second light guide plate 342 can be disposed under the first light guide plate 341. A second PCB 357 can be disposed to face a side surface of the second light guide plate 342. The second PCB 357 can be loaded with infrared LEDs 353.

The visible LEDs 351 and the infrared LEDs 353 which are mounted on the first and second PCBs 356 and 357, respectively, can be driven different drive voltages from each other.

The same pattern can be formed on each the surfaces of the first and second light guide plates 341 and 342. The fixed patterns on the surfaces of the first and second light guide plate 341 and 342 can enhance the uniformity of light progressing upwardly from the first and second light guide plates 341 and 342.

Alternatively, different patterns can be formed on the first and second light guide plates 341 and 342, respectively. The first light guide plate 341 inputs both of visible light and infrared light. As such, a fixed pattern capable of enhancing the uniformities for both visible light and infrared light can be formed on the first light guide plate 341. Meanwhile, another fixed pattern capable of enhancing the uniformity of infrared light can be formed on the second light guide plate 342 because only infrared light is entered the second light guide plate 342.

The patterns formed on the first and second light guide plates 341 and 342 can become one of a hemisphere pattern and a hemi-cylindrical. The first and second light guide plates 341 and 342 can be formed from PMMA.

The first PCB 356 and the visible LEDs 351 loaded thereon can form a first light source module. Similarly, the second PCB 357 and the infrared LEDs 353 loaded thereon can form a second light source module.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display device comprising:
    at least one sensor module configured to sense an amount of external light;
    a liquid crystal display panel configured to display images;
    at least one light source module disposed under the liquid crystal display panel and configured to emit light; and
    at least one light guide plate configured to convert light from the at least one light source module into two-dimensional light and apply two-dimensional light to the liquid crystal display panel,
    wherein the at least one light source module includes infrared LEDs and visible LEDs which are selectively driven according to a sensed light quantity sensed by the at least one sensor module and allow infrared light and visible light to be selectively emitted,
    wherein the at least one light source module includes a first PCB (printed circuit board) having the visible LEDs and a second PCB having a plurality of protrusive regions,
    wherein the visible LEDs are disposed on the first PCB and the infrared LEDs are disposed on the protrusive regions of the second PCB,
    wherein the second PCB is attached on the first PCB and the protrusive regions are each disposed between the visible LEDs, and
    wherein the sum of thicknesses of the infrared LED and the second PCB is the same as the thickness of the visible LED.

2. The liquid crystal display device of claim 1, wherein the infrared LEDs and the visible LEDs are arranged alternately with each other on a PCB (printed circuit board).

3. The liquid crystal display device of claim 1, further comprising a backlight driver configured to drive the light source module based on a sensing voltage which varies along the sensed light quantity and is applied from the at least one sensor module.

4. The liquid crystal display device of claim 3, wherein the backlight driver includes:
    an infrared light driver configured to drive the infrared LEDs; and
    a visible light driver configured to drive the visible LEDs, and selectively drive the infrared light driver and the visible light driver according to the level of the sensing voltage.

5. The liquid crystal display device of claim 4, wherein the backlight driver further includes a comparator the sensing voltage with a reference voltage, and enables the infrared light driver and the visible light driver to be selectively driven according to a resultant compared by the comparator.

6. The liquid crystal display device of claim 5, wherein the backlight driver further includes:
    a first transistor connected to the infrared light driver; and
    a second transistor connected to the visible light driver, and controls the first and second transistors to be turned-on/off according to the resultant compared by the comparator.

7. The liquid crystal display device of claim 4, wherein the backlight driver further includes a voltage input portion configured to apply a drive voltage to the infrared light driver and the visible light driver regardless of the sensing voltage.

8. The liquid crystal display device of claim 1, wherein the at least one sensor module includes a photo diode.

9. The liquid crystal display device of claim 3, further comprising;
    a top cover configured to cover edges of the liquid crystal display panel; and a bottom cover configured to receive the at least one light guide plate and the at least one light source module, wherein the sensor module is disposed on a front surface of the top cover, the backlight driver is disposed on a rear surface of the bottom cover, and the sensor module and the backlight driver are electrically connected to each other by means of a flexible printed-circuit board.

10. The liquid crystal display device of claim 9, wherein the at least one sensor module includes a plurality of sensor modules disposed on at least one of the top cover and the bottom cover.

11. The liquid crystal display device of claim 10, wherein the backlight driver obtains an average value from a plurality of light quantities from the plurality of sensor modules and selectively drives the visible light driver and the infrared light driver based on the average value.

12. The liquid crystal display device of claim 1, wherein the at least one light source module includes light source modules disposed near both side surfaces of the light guide plate.

13. The liquid crystal display device of claim 12, wherein the infrared LEDs are arranged near a side surface of the light guide plate, and the visible LEDs are arranged near the other side surface of the light guide plate.

14. The liquid crystal display device of claim 1, wherein the at least one light guide plate includes a first light guide plate and a second light guide plate disposed under the first light guide plate, the visible LEDs are arranged near a side surface of the first light guide plate, and the infrared LEDs are arranged near a side surface of the second light guide plate.

15. The liquid crystal display device of claim 14, further comprising different patterns formed on surfaces of the first and second light guide plates and configured to enhance light uniformity.

16. The liquid crystal display device of claim 1, further comprising polarizer sheets attached to both surfaces of the liquid crystal display panel, wherein the polarizer sheets become one of a wire grid polarizer sheet, a birefringent polarizer sheet and a cholesteric liquid crystal polarizer sheet.

17. The liquid crystal display device of claim 6, wherein one of the first and second transistors is p-type transistor, the other is n-type.

18. The liquid crystal display device of claim 1, wherein the infrared LEDs are driven by a same drive voltage.

19. The liquid crystal display device of claim 1, wherein a shape of the protrusive regions is a rectangular-shaped tooth.

* * * * *